J. B. Christian,
Fish Hook,
Nº 79,446. Patented June 30, 1868.
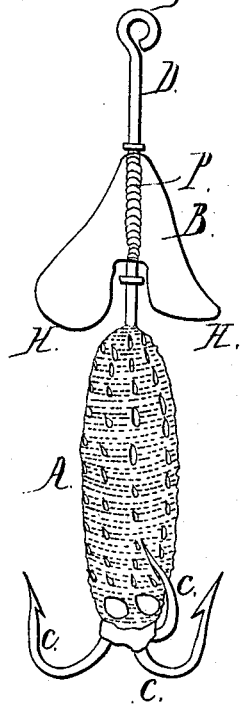
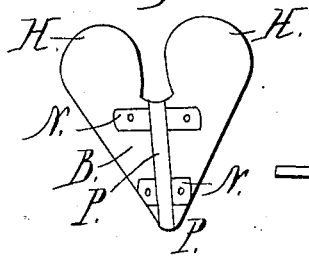
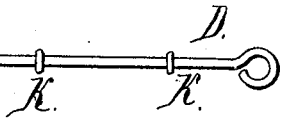
Inventor:
John B. Christian

United States Patent Office.

JOHN B. CHRISTIAN, OF MOUNT CARROLL, ILLINOIS.

*Letters Patent No. 79,446, dated June 30, 1868.*

IMPROVEMENT IN FISH-HOOKS.

*The Schedule referred to in these Letters Patent and making part of the same.*

---

TO ALL WHOM IT MAY CONCERN:

Be it known that I, JOHN B. CHRISTIAN, of Mount Carroll, in the county of Carroll, in the State of Illinois, have invented a new and improved Fish-Hook; and I do hereby declare that the following is a full and exact description thereof, reference being had to the accompanying drawings, and to the letters of reference marked thereon.

The nature of my invention consists in so arranging a fish-hook that the artificial worm or bait will be close up to the bend of the hooks, and having a revolving plate near the end of it.

To enable others skilled in the art to make and use my invention, I will proceed to describe its construction and operation.

I prepare a brass or steel wire, of a suitable length, shown at D, Figure 3, having a ring at one end of it, and the hooks c c c soldered to it at the other end, having the barbs about equidistant from each other. I then construct or form a plate, B, of tin plate, or other suitable sheet metal, having a groove, P, pressed into it, for the purpose of attaching it to the wire, so that its centre of gravity may be within the wire, in order to have it revolve freely, with the least possible force applied to it, by being drawn through the water. I then put two strips of metal, N N, across the groove P, when the wire D is inserted, and clinch the rivets, as shown at Figure 2. The ends of the plate B, I then bend in opposite directions, as shown at H H, Figure 1, for the purpose of each making a resistance in the water in the same direction, and consequently causing it to revolve freely with a slight motion through the water. It is confined to its place on the wire by two small circular wires, K K, soldered to the wire D.

I color or paint one side of the plate B red. I then form an artificial worm, A, around the straight portion of the hooks, up to the bend in them, and continue it nearly up to the revolving plate B. It can be made of woollen yarn or rubber, or any other suitable material.

I place it close to the hooks, for this purpose: A fish cannot bite the worm, or take it in its mouth, without the barbs coming in contact and fastening to some portion of its mouth, whereas if the hooks were two or more inches from the bait, hung in a ring or joint, a bite from a fish might or might not become attached to it.

This hook is operated by being drawn through the water, back and forth, generally near the surface.

I do not claim as new simply attaching three hooks to a wire, but the arrangement of them in relation to the artificial worm and revolving plate.

What I claim as my invention, and desire to secure by Letters Patent, is—

The revolving grooved plate B, the artificial worm A, the hooks c c c, and the wire D, as arranged in relation to each other, substantially as herein described.

JOHN B. CHRISTIAN.

Witnesses:
T. T. JACOBS,
O. F. REYNOLDS.